(12) United States Patent
Oriard et al.

(10) Patent No.: US 10,391,452 B2
(45) Date of Patent: Aug. 27, 2019

(54) PORTABLE LIQUID-FILTRATION DEVICE

(71) Applicant: CASCADE DESIGNS, INC., Seattle, WA (US)

(72) Inventors: Timothy Lewis Oriard, Bellevue, WA (US); Paul Kevin Smith, Kirkland, WA (US); Steven Robert Schwennsen, Seattle, WA (US)

(73) Assignee: CASCADE DESIGNS, INC., Seattle, WA (US)

( * ) Notice: Subject to any disclaimer, the term of this patent is extended or adjusted under 35 U.S.C. 154(b) by 29 days.

(21) Appl. No.: 15/528,973

(22) PCT Filed: Nov. 24, 2015

(86) PCT No.: PCT/US2015/062515
§ 371 (c)(1),
(2) Date: May 23, 2017

(87) PCT Pub. No.: WO2016/086048
PCT Pub. Date: Jun. 2, 2016

(65) Prior Publication Data
US 2017/0266621 A1    Sep. 21, 2017

Related U.S. Application Data

(60) Provisional application No. 62/083,877, filed on Nov. 24, 2014.

(51) Int. Cl.
*B01D 61/18* (2006.01)
*B01D 61/20* (2006.01)
(Continued)

(52) U.S. Cl.
CPC .............. *B01D 61/18* (2013.01); *B01D 61/20* (2013.01); *C02F 1/002* (2013.01); *C02F 1/44* (2013.01);
(Continued)

(58) Field of Classification Search
CPC ...... B01D 61/18; B01D 61/20; B01D 35/147; B01D 35/26; B01D 2321/04; B01D 65/02;
(Continued)

(56) References Cited

U.S. PATENT DOCUMENTS

| 4,975,185 A | 12/1990 | Taylor |
| 5,266,196 A * | 11/1993 | Fife ..................... B01D 35/147 |
| | | 210/416.3 |

(Continued)

FOREIGN PATENT DOCUMENTS

| GB | 2473836 A | 3/2011 |
| WO | WO 1993/002781 A1 | 2/1993 |
| WO | 2008115587 A1 | 9/2008 |

OTHER PUBLICATIONS

International Search Report and Written Opinion for PCT Application No. PCT/US2015/062515 dated Feb. 3, 2016, 9 pages.
(Continued)

*Primary Examiner* — Pranav N Patel
(74) *Attorney, Agent, or Firm* — BakerHostetler

(57) ABSTRACT

A portable liquid-filtration device includes an inlet port, a filtering portion including a filtering medium and fluidly coupled to the inlet port, a filtered-liquid output port fluidly coupled to the filtering portion, a flush port fluidly coupled to the filtering portion, and a manually activated pump assembly fluidly coupled to the inlet port, filtering portion, output port and flush port. The pump assembly is configured, when activated, to create a negative fluid pressure at the inlet port and a positive fluid pressure at the output port and the flush port. As a consequence of activation of the pump assembly, the filtering portion receives unfiltered liquid from the inlet port, the output port receives from the filtering portion only liquid traversing the filtering medium in a first direction, and the flush port receives from the filtering
(Continued)

portion liquid traversing the filtering medium in a second direction different from the first direction.

19 Claims, 11 Drawing Sheets

(51) Int. Cl.
*C02F 1/44* (2006.01)
*C02F 1/00* (2006.01)

(52) U.S. Cl.
CPC ........ *C02F 1/444* (2013.01); *B01D 2313/243* (2013.01)

(58) Field of Classification Search
CPC .......... B01D 2313/243; B01D 2313/20; B01D 2313/10; B01D 2313/105; B01D 2313/24; C02F 1/444; C02F 1/002; C02F 2307/02; C02F 9/005; C12Q 1/1627; C12Q 1/6833; C12Q 1/6886; C12Q 2537/164; C12Q 2600/154; C12Q 2600/172
See application file for complete search history.

(56) References Cited

U.S. PATENT DOCUMENTS

| | | |
|---|---|---|
| 5,330,640 A | 7/1994 | Fife et al. |
| 5,431,816 A | 7/1995 | Aldred et al. |
| 5,531,887 A | 7/1996 | Miers |
| 6,010,626 A | 1/2000 | D'Agostino |
| 8,147,685 B2 | 4/2012 | Pritchard |
| 8,281,937 B2 | 10/2012 | Collins et al. |
| 8,557,115 B2 | 10/2013 | Collins et al. |
| 2010/0170834 A1 | 7/2010 | Stephens et al. |
| 2010/0276347 A1 | 11/2010 | Cui |
| 2012/0292238 A1 | 11/2012 | Wright |
| 2013/0319084 A1 | 12/2013 | Milman et al. |

OTHER PUBLICATIONS

Wang, H. et al., Understand the Basics of Membrane Filtration. CEP. Apr. 2013. [retrieved on Jan. 7, 2016] retrieved from the internet <URL: http://research.che.tamu.edu/groups/Seminario/numerical-topics/membrane%20filtration.pdf>; 8 pages.

European Patent Application No. 15864124.1; Extended Search Report; dated Jun. 18, 2018; 10 pages.

* cited by examiner

PORTABLE LIQUID-FILTRATION DEVICE

PRIORITY CLAIM

This patent application claims priority to U.S. Provisional Patent Application Ser. No. 62/083,877 filed Nov. 24, 2014, the entirety of which is hereby incorporated by reference as if fully set forth herein.

BACKGROUND OF THE INVENTION

The need for a readily-available supply of fluids to combat dehydration during strenuous activity is well-known. When dehydration occurs, the level of water in the body is below the level necessary for normal body function. Chronic dehydration can lead to short-term and long-tern health problems, including kidney damage. To prevent dehydration, it is imperative that water be consumed regularly at intervals frequent enough to replace water lost through elimination, perspiration and respiration.

One of the challenges to remaining effectively hydrated when undertaking activities in remote locations, such as hiking, camping, climbing and backpacking, is the difficulty in acquiring the volume of potable water to remain properly hydrated. When undertaking these activities, the sheer weight of the water that is required to remain properly hydrated is very cumbersome for an individual to carry. Likewise military personnel have difficulties in replenishing the potable water consumed by forward deployed warfighters that have been effectively removed from conventional supply lines.

Consequently it is highly desirable to consume water from a natural freshwater source encountered in a remote location such as rivers, creeks, streams, lakes, and ponds to avoid dehydration. However a freshwater source cannot inherently be assumed potable as a large percentage of such water is microbiologically unfit for human consumption. This is because such sources potentially contain a myriad of harmful microbiological pathogens. Ingestion of these microbiological pathogens such as viruses, bacteria, and protozoa are known to significantly contribute to diarrheal diseases. Hence to remain effectively hydrated in these remote locations, it is imperative to utilize a personal filtration device for treating water to remove these microbiological pathogens.

Treating water in remote locations using a personal filtration device can be highly effective in reducing the risk of waterborne diseases for people who have no other option than to replenish their fluids from a natural freshwater source. These personal filtration devices include a variety of water purification media that utilize a physical-barrier (i.e., size-exclusion) approach to removing microbiological pathogens and include activated carbon block membrane, ceramic membranes, glass fiber membranes, and polymeric flat sheet and hollow fiber membranes. Personal filtration devices with a physical barrier are superior to a halogen-based disinfectant for treating a freshwater source of an unknown water quality. Chemical disinfectants are unable to remove halogen resistant protozoa (e.g., cryptosporidium) without a long dwell time (4 hours or longer) that potentially puts the user at risk of becoming dehydrated while waiting for the water to become safe to drink. Furthermore, the effectiveness of these chemical disinfectants is highly dependent on the concentration of organic carbon arising from natural organic matter and the temperature of the surface water. Additionally, the halogen-based disinfectants decrease the palatability of the treated water (affects both tastes and odor) which has been shown to reduce the water intake by the user. Finally, unlike chemical disinfectants, the use of a physical barrier removes any suspended solids and colloidal particles from the freshwater source being treated.

A typical arrangement for a personal filtration device is one whereby a filter cartridge containing the size-exclusion membrane is in series with a volumetric-displacement-type, hand-operated pump. Any number of different pumping mechanisms can be employed for delivering the fluid from the contaminated water source to the filter cartridge. For example, a moveable piston or plunger pump can be incorporated into the housing of the personal filtration device to offer a hand-held pumping mechanism. Sample personal filtration devices for purifying water in remote locations with a hand-operated pump are disclosed in U.S. Pat. Nos. 5,330,640, 6,010,626, 8,147,685, 8,281,937, 8,557,115 and U.S. Patent Application No. 2010/0170834.

The art teaches the use of hand pumping devices coupled with a variety of proven water filtration media, including ceramic membranes, glass fiber membranes, and polymeric flat sheet and hollow fiber membranes. The current art also indicates that personal filtration devices of this configuration should be operated in a dead-end filtration mode. When using a dead-end filtration technique, all of the fluid passes through the membrane and all particles larger than the pore sizes of the membrane are stopped at its surface. This means that the trapped debris start to build up a "filter cake" on the surface of the membrane which reduces the efficiency of the filtration process. A reduction in the efficiency of the personal filtration device is observed when these devices are used over an extended period of time to treat freshwater sources with high concentrations of suspended solids and/or natural organic matter. Back-flushing the filter, by reversing the flow through the membrane to remove the debris trapped inside the filter housing, can help unclog the filter by removing the filter cake.

One significant disadvantage of prior-art hand pump personal filtration devices is the inability of their membrane surfaces to be easily cleaned after being used to treat a freshwater source that quickly clogs the membrane surface. The art teaches that the personal filtration device must be manually reconfigured in order to initiate the cleaning step to remove the filter cake. Examples of this mentioned in the art include the user disassembling the filter cartridge in the field to expose the clogged membrane surface or altering/reversing the direction of the flow check valve(s) to initiate a back-flushing procedure. Additionally, special tools are often required to be carried in order to clean the membrane surface. For example, cleaning a ceramic filter is often achieved by using a scouring pad to manually abrade the surface of the ceramic membrane. Furthermore, the user must be careful to only undertake this cleaning step using known potable water to avoid contaminating the clean side (downstream) of the filter cartridge with any microbiological pathogens.

The art indicates that semi-permeable hollow fiber membranes are an effective physical barrier for removing microbiological pathogens since they provide a very high membrane surface per unit volume of the filter cartridge. Consequently, the use of a hollow fiber membrane enables the personal filtration device to have a lighter and more compact (size-efficient) design for the same water production than if the filter cartridge was fabricated from other types of physical barrier materials used in the construction of personal filtration devices.

When compared to ceramic membranes, one of the key performance limitations of using hollow fiber membranes is that it is difficult to completely remove the filter cake from the membrane surface. Ceramic membranes were designed to be cleaned using a mechanical abrasion approach that fully removes the filter cake from the membrane surface but this cleaning procedure cannot be replicated on the more fragile hollow fiber membranes. This means that personal filtration devices with a hollow fiber cartridge can only be cleaned by altering the flow path through the filter cartridge. Furthermore, it is not always possible for visual inspection of the condition of the hollow fiber membrane to determine the extent of the filter cake deposited on the membrane's surface. Therefore, the cleaning step could potentially be initiated at a point where the back flush process may only be partially effective at restoring the water production capabilities of the filter cartridge due to severe buildup of the filter cake. This problem can be addressed by increasing the size of the hollow fiber filter cartridge to spread the filter cake over a larger membrane surface area but this comes at the expense of making the filter small and compact in size.

BRIEF DESCRIPTION OF THE DRAWINGS

The accompanying drawing figures, which are incorporated in and form a part of the specification, illustrate the embodiments of the present invention and, together with the description, serve to explain the principles of embodiments of the invention. In the drawing.

DETAILED DESCRIPTION OF THE INVENTION

Figure 1:
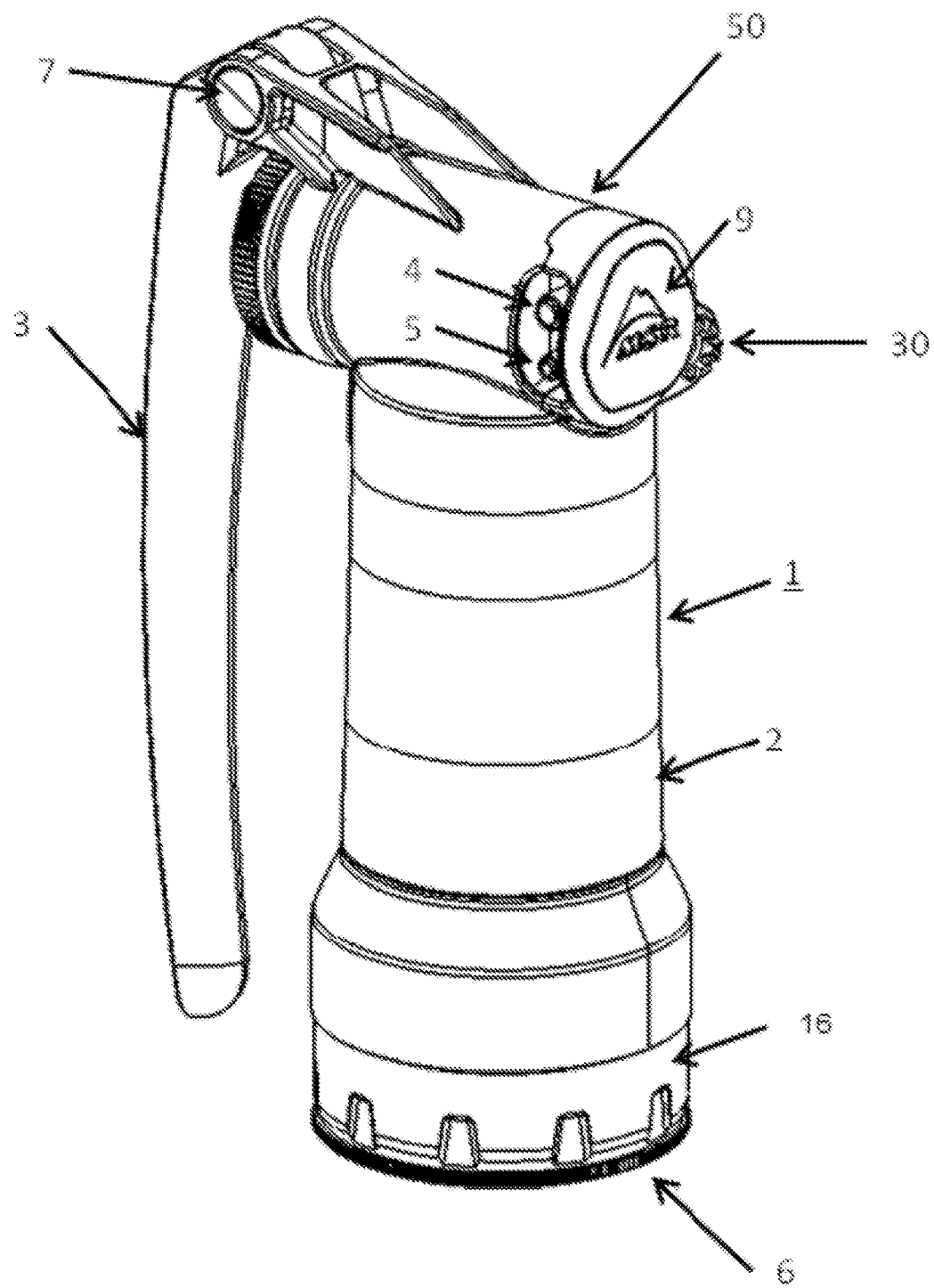
FIG. 1 is a perspective view of a pump assembly embodiment of a personal filtration device according to an embodiment of the invention.

In light of the above-discussed disadvantages and limitations of the methods and filter assemblies described in the prior art, it is highly desirable to provide a compact personal filtration device that integrates an ergonomic hand pump mechanism with a hollow fiber filter cartridge that has a low degree of effort associated with reducing the filter cake formation that adversely impacts the water production of this device. It is also desirable that this personal filtration device provides a mechanism for enabling the filter cartridge to be cleaned in the field without having to manually reconfigure or disassemble the filter cartridge while also preventing the clean side of the filter cartridge from potentially becoming microbiologically contaminated during the cleaning process.

An embodiment of the present invention provides a personal filtration device that integrates a hand pump mechanism with a hollow fiber fillet cartridge for the selective removal of contaminants to produce potable water that substantially addresses one or more of the disadvantages and limitations of the existing art. In particular, the disclosed personal filtration system is able to treat microbiologically contaminated drinking water in a method that eliminates any requirement to manually alter or disassemble the device to initiate a back-flushing or other cleaning step to remove the filter cake that deposits on the surface of the membrane. An embodiment includes a filter cartridge with self-cleaning ability to continually remove any trapped debris that builds up on the surface of the hollow fiber membrane. In other words, the user does not need to interrupt the filtration process in order to periodically back-flush the hollow fiber membrane since the device removes the clogging/fouling materials while it is simultaneously producing filtered water.

An apparatus embodiment of the invention includes a personal filtration device having a hollow fiber filter cartridge specifically designed to be inherently self-cleaning through the use of a continuous cross-flow filtration technique. In cross-flow filtration, the fluid feed stream runs tangential to the hollow fiber membrane and thereby establishes a pressure differential across the membrane. Therefore, in contrast with the prior art, in which the filtration cartridge only has an inlet and an outlet port, the personal filtration device described in the present invention produces potable water by splitting the incoming fluid stream being treated by the hollow fiber filter cartridge into two separate streams that continually exit the filter housing. In other words, the filter cartridge includes a chamber for receiving the hollow fiber membrane and three fluid conduits: an inlet port for receiving the unfiltered fluid, an outlet port for dispensing the filtered fluid, and a flush port that discharges the flush fluid containing the particulate matter that did not permeate through the hollow fiber membrane.

The hollow fiber membrane bundle is supported and sealed inside the designated chamber within the filter housing by a hardened resin. Both of the potted ends of the hollow fiber membrane are open so that fluid can enter the bore (lumen) of the hollow fiber at one of the supported open ends of the filter cartridge then traverse the entire length of the hollow fiber membrane before exiting the filter cartridge through the other supported open end of the hollow fiber. In this flow configuration, the contaminated fluid from the pump head entering the filter cartridge through the inlet port is then equally dispersed into the numerous open ends that comprise the upstream side of the hollow fiber bundle. The contaminated fluid then flows along the length of the hollow fiber membrane towards the other open end and may become filtered only when flowing through the membrane wall to the shell side (outside) of the hollow fiber membrane. The treated water that is collected on the shell side of the hollow fiber membrane exits the filter cart through the outlet port located at the base of the personal filtration device.

A consequence of this inside-out flow configuration is that the lumens of each hollow fiber membrane will eventually become clogged by the forming filter cake. However by having both ends of the hollow fiber open, the debris that typically leads to the formation of the filter cake is instead able to exit the bore of the hollow fiber membrane at the downstream end of the filter cartridge. Consequently, the filter cartridge design of an embodiment is based on using a small fraction of the incoming fluid stream delivered to the hollow fiber filter cartridge from the pump head to traverse the entire length of the hollow fiber membrane to remove any debris that resides on the surface of the hollow fiber membrane and carry these particles away from the membrane surface to the flush port. This continual self-cleaning of the filter cartridge eliminates the need to periodically back-flush the membrane in order to dislodge/remove the filter cake that is formed inside the lumens of the hollow fibers.

The amount of the incoming fluid stream that exits the filter cartridge through the flush port is controlled by the flow restriction orifice that is mounted into the flush port. The flush port is preferentially located sufficiently distant from the filtered fluid exiting the hollow fiber membrane cartridge to avoid any contamination of the filtered fluid side of the device. In an embodiment, the flush port may be positioned adjacent the inlet port for the unfiltered fluid entering the pump head. The flush fluid from the filter cartridge is discharged via flexible tubing sufficiently distant from the personal filtration device to prevent the user from becoming splashed by the flush fluid or having his/her feet or personal belongings become wet as the personal filtration device is being operated. One such approach includes returning the flush fluid back to the freshwater source being filtered by the personal filtration device.

The fluid exiting through the flush port also serves as a convenient pathway for removing air entrapped inside the filter cartridge. Air can enter the filter cartridge in the form of bubbles present in the untreated water when the filter cartridge has been drained of water or as dissolved gases which can then coalesce over time with other air bubbles to form larger air bubbles that are difficult to remove from the filter housing. Hollow fiber membranes for water purification are hydrophilic in order to be able to efficiently transport water through the membrane. The hydrophilic nature of the membrane implies that air cannot, or minimally can, traverse the membrane walls when they are wet. Consequently, pockets of entrapped air can form on the membrane surface and impede the flow of water through the membrane. Although this problem can be overcome by placing a number of hydrophobic hollow fiber membranes in the filter housing designed for dead-end filtration, this feature of the filter cartridge provides a simple and cost-effective approach for expelling such air through the flush port.

In an embodiment of the invention, a filter cartridge containing looped fibers could be utilized. The fibers are looped and may be only potted at one end of the cartridge. The contaminated fluid flow may enter the cartridge on the exterior of looped fibers. The treated water may be collected at the bores of the looped fibers at the potted end. This embodiment may require a second port in the filter cartridge open to the contaminated fluid on the outside of the fiber bundle. As described in the embodiment above, a fraction of the incoming fluid stream would be diverted back out of the filter cartridge carrying away accumulated debris. This flush mechanism would not be as effective but would provide some amount of cartridge cleaning.

In an embodiment of the invention, the personal filtration device includes an intrinsic pressure relief function. In such embodiment, the personal filtration device features a pressure-relief valve embedded into the flush port of the filter cartridge. This feature is designed to prevent any of the active filtration components from being exposed to a pressurized fluid in excess of a predetermined value that could compromise their mechanical integrity. The flow rate of the flush fluid remains constant during normal operation of the personal filtration device. However once the fluid pressure exceeds a predetermined level in the filter due to clogging of the hollow fiber membrane, the pressure relief valve momentarily increases the volume of the pressurized fluid being discharged through the flush port. Only when the operating pressure falls below this predetermined level does the normal flow distribution within the hollow fiber membrane cartridge resume. The use of a pressure-relief valve possessing this property also simplifies the construction of the device since it eliminates the need for a separate fluid bypass circuit.

In an embodiment of the invention a flow-regulation valve is used to maintain constant filtered water output per pump stroke. Over the lifespan of the filter cartridge the hollow fibers will begin to accumulate particulates despite the fluid flush mechanism that transports much of the filter cake out the flush port. As the hollow fibers accumulate particulates, the internal pressure of the fibers will increase. If not regulated, the flow of flush fluid would increase with the increasing pressure in the fibers. This would in turn reduce the flow of filtered water. The user may produce less and less filtered water for each pump stroke as the internal pressure increases and eventually no filtered water would be collected.

To keep the flow of filtered water constant with respect to pump strokes, a flow regulation valve is positioned in the flush stream. The valve operates based on pressure in the hollow fibers. As the internal pressure in the fibers increases, the orifice of the flow regulation valve decreases in diameter. The valve is tuned such that the volume of the flush stream is always a preferred amount, between, for example, 5 and 10% of the inlet stream. The user may need to pump with more force as internal pressure builds, but the output of filtered water per stroke remains constant.

In an embodiment of the invention, the personal filtration device utilizes a flexible dual-lumen tubing to provide a conduit between the contaminated freshwater source being treated and the pump head. This feature conveniently allows one end of the dual-lumen tubing to be placed directly in the water source being filtered and eliminates the need for the user to carry an additional piece of flexible tubing for transporting the flush fluid. One side of the dual-lumen tubing is attached to the inlet port located on the pump head while the other side is attached to the flush port to discharge the fluid used to self-clean the hollow fiber membrane into the freshwater source being purified.

In an embodiment of the invention, the hollow fiber filter cartridge is fabricated from an ultrafiltration membrane that has been shown to reduce the concentration of viruses, bacteria and protozoa in microbiologically contaminated water to a level that satisfies the water quality requirements specified in the relevant guidelines for potable water of the United States Environmental Protection Agency (EPA), National Sanitation Foundation (NSF) international and the World Health Organization (WHO). In other words, this feature enables the personal filtration device to be classified as a microbiological purifier. However if complete virus removal is not a requirement for the freshwater source being purified, the hollow fiber filter cartridge can alternatively be fabricated with a microfiltration membrane that satisfies the regulatory requirements for removing bacteria and protozoa.

In an embodiment of the invention, the personal filtration device is comprised of a dual-acting (double-action) pump mechanism in order to maximize the production rate of potable water produced by the hollow fiber filter cartridge. The pump head is configured so that while one side of the piston/plunger pushes fluid through the filter to discharge it, the other side introduces more fluid into the pump head. Consequently, the discharge of fluid from the pump head through the filter occurs on both the in and out strokes (i.e., discharge in both directions). Therefore both strokes are effective at discharging fluid through the filter as there are no idle strokes. This pump configuration provides a continuous fluid supply with only minor fluctuations in the flow of fluid through the hollow fiber filter cartridge. The major advantage of utilizing a dual-acting pump configuration is that it is possible to reduce the size of the filter element and the pump head without reducing the rate of production of microbiologically safe drinking water, allowing for a more compact water purifier. This feature allows the hollow fiber cartridge to be smaller and provides a more comfortable pumping experience due to the lower feed pressure that must be generated by the manual pumping motion.

In an embodiment of the invention, an additional feature of the personal filtration device is the inclusion of an adaptor base that allows the filter to be directly connected to a fluid container into which the filtered water can be discharged. The personal filtration device is capable of being directly and securely coupled to the fill port of a fluid storage container such as the standard wide neck bottle interface. Mechanical coupling of the fluid container to the personal filtration device will prevent unintentional disengagement of these components during the filling process. A threaded-type interface with the discharge end of the personal filtration device is considered to be one example of a secure engagement means. Alternatively, a piece of flexible tubing attached to the outlet port of a personal filtration device can be inserted onto the mouth of the fluid storage container. When the container becomes full, the tube is removed and the container sealed.

In an embodiment of the invention, the personal filtration device may include a pre-filter to assist the hollow fiber filter cartridge in removing suspended solids from the contaminated water source. Pre-filters are common in the current art of portable water filtration apparatus to prevent damage to the piston/plunger in the pump head. The pre-filter also prevents particles from entering the filter cartridge that can potentially plug the lumens of the hollow fiber membranes. The pre-filter, which is attached to the end of the inlet hose placed in the water source, can be fabricated from a mesh, foam or textile filter or a combination of different materials.

Reference will now be made in detail to the preferred embodiments of the present invention, examples of which are illustrated in the accompanying drawing figures. Turning to the drawing figures, identical numerals correspond to the same or similar features in each of the several views. The drawing is not intended to indicate the scale or relative proportions of the elements shown therein. Unless otherwise noted, all parts are preferably fabricated from plastic or similar lightweight yet strong material.

Figure 2:
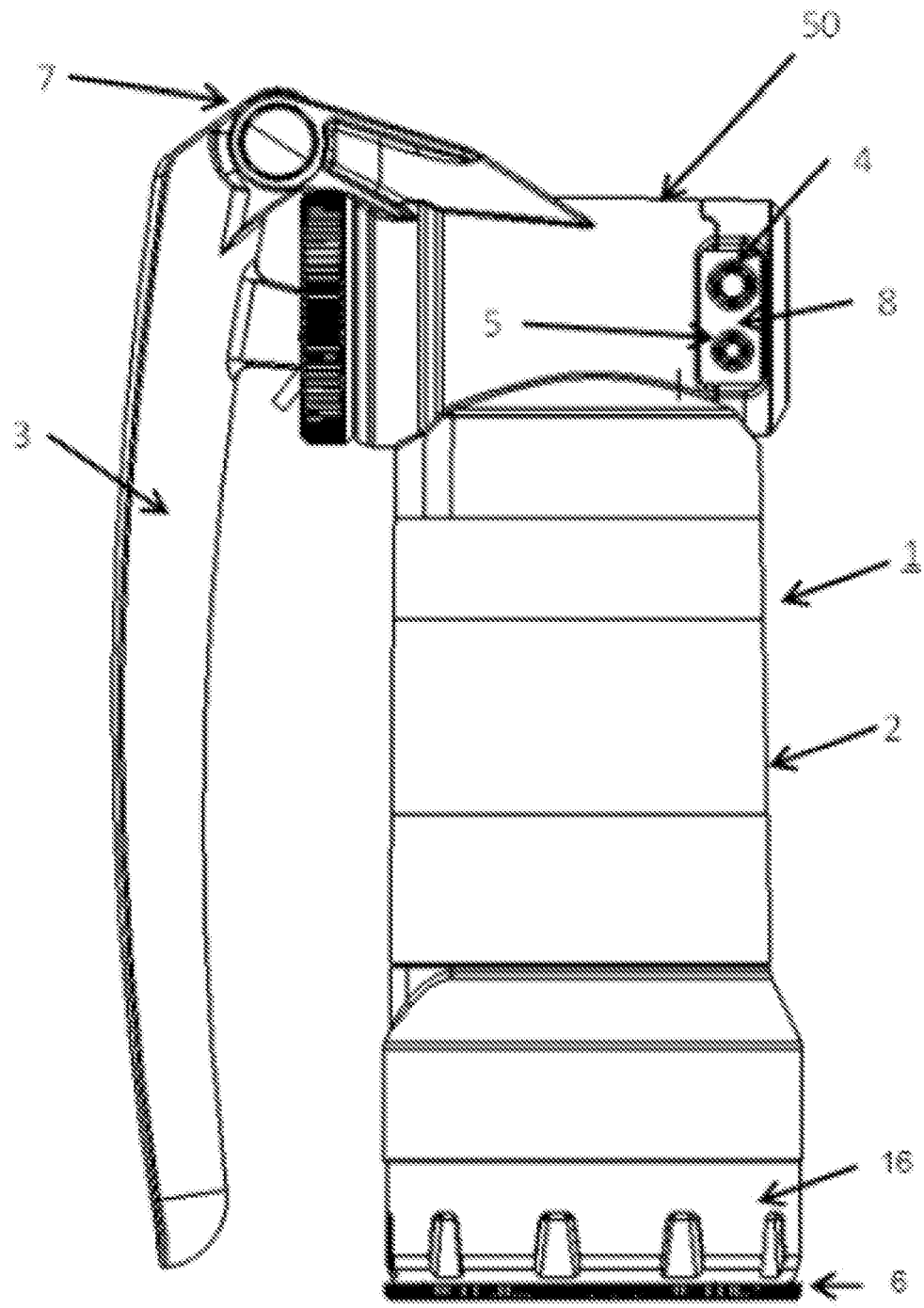
FIG. 2 is a side evaluation view of a pump assembly of the embodiment shown in FIG. 1.
Figure 3:
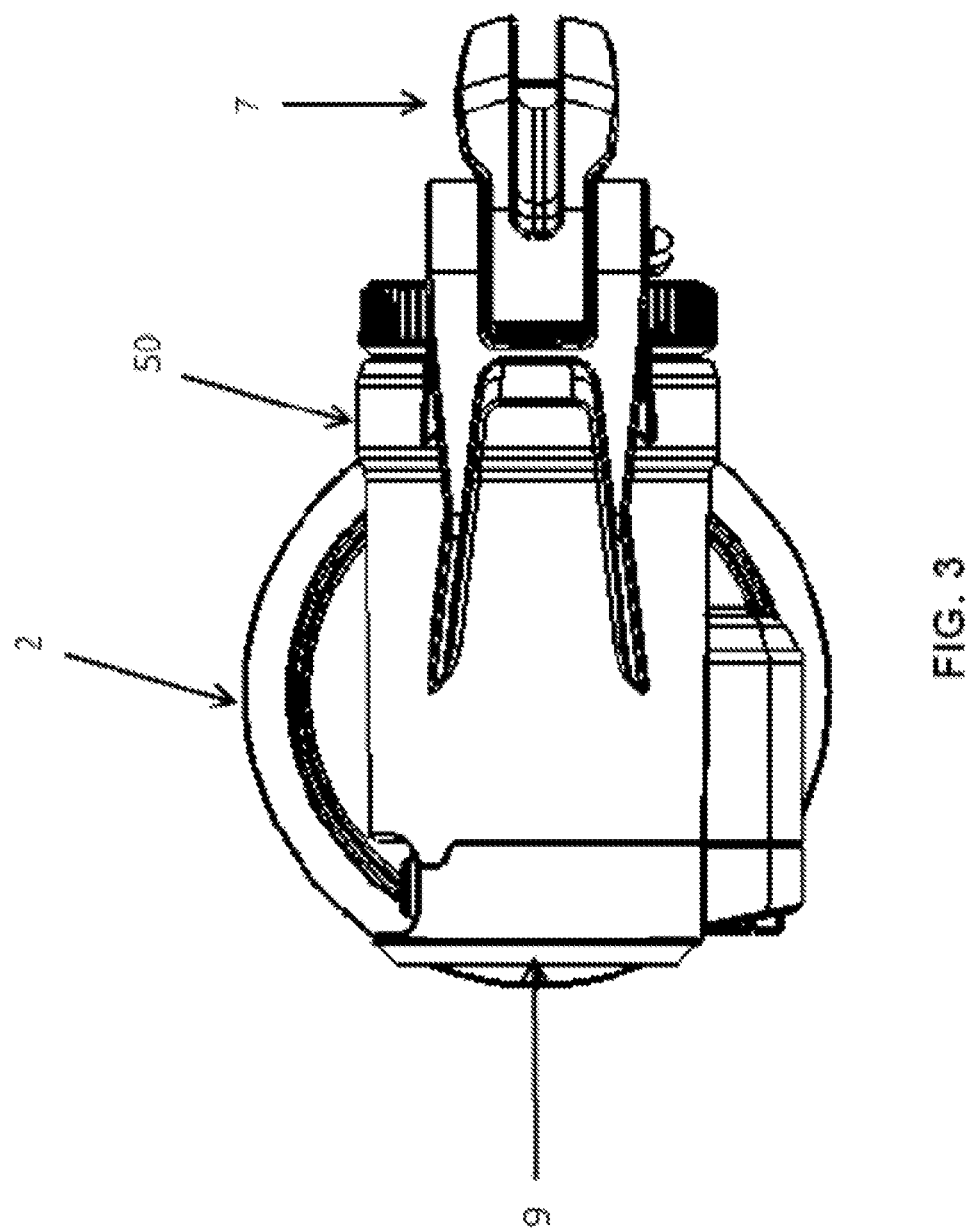
FIG. 3 is a top evaluation view of a pump assembly of the embodiment shown in FIG. 1.
Figure 4:
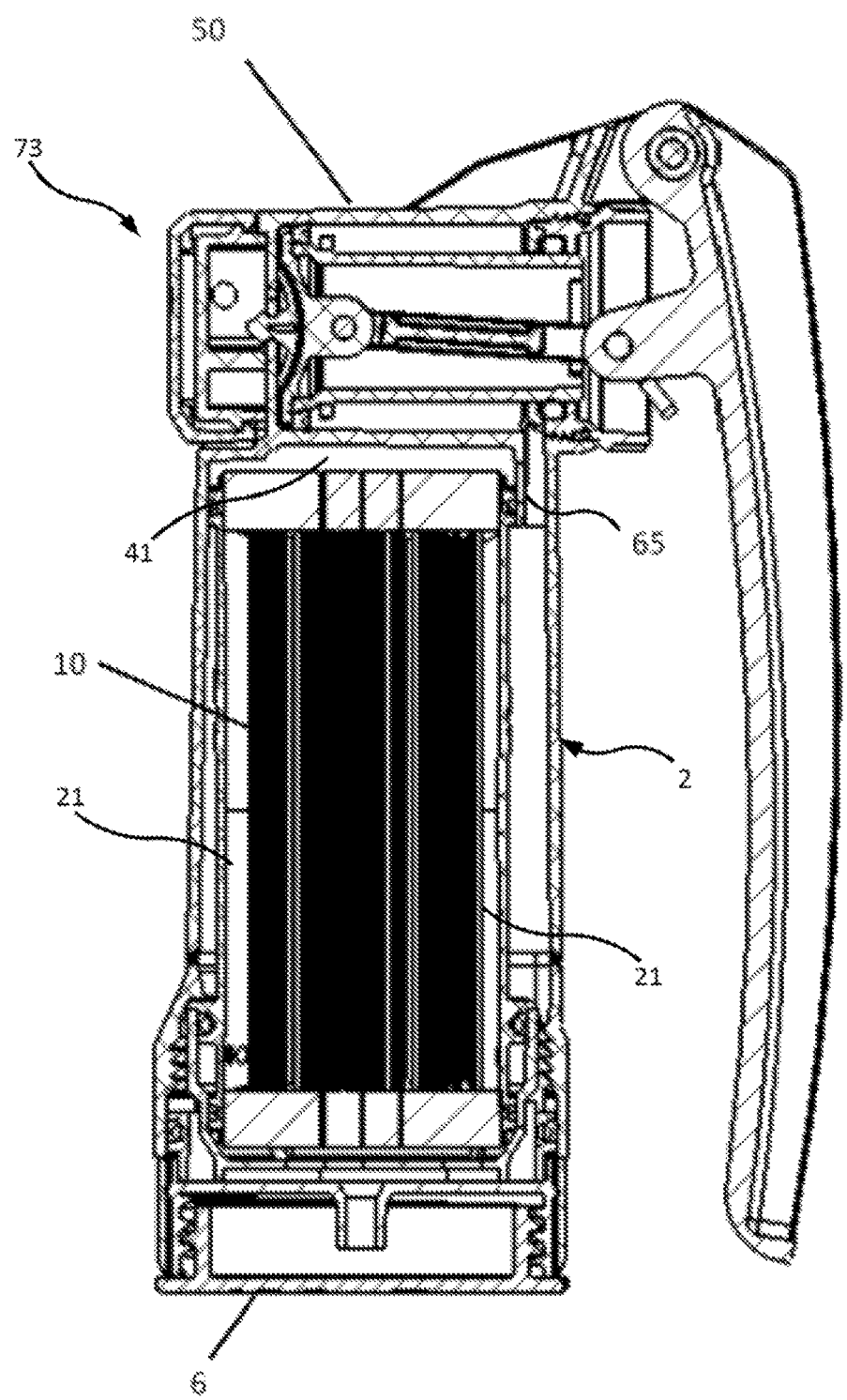
FIG. 4 is a side evaluation view in cross section of the embodiment shown in FIG. 1.

In accordance with one aspect of an embodiment, a personal filtration device 1 according to one embodiment is illustrated in FIGS. 1-4. FIGS. 1-3 illustrate the exterior of the personal filtration device 1, whereas FIG. 4 illustrates a cross section of the device to illustrate the fluid movement inside a filter cartridge 10. The personal filtration device 1 may be used for the purification of water or other fluids that potentially contain microbiological pathogens. In particular, the personal filtration device 1 is small and lightweight so that it can be used by persons, such as hikers, campers, backpackers, climbers, and forward deployed warfighters, traveling through the backcountry or internationally.

As shown in FIGS. 1-6, the personal filtration device 1 is constructed and designed so that a pump head assembly 73 provides a means for delivering the fluid to be filtered to a pump body 2 by means of moving a lever-action handle 3. The fluid to be filtered (influent stream) enters the pump head assembly 73 through an inlet port 4 which is mounted onto an inlet assembly 8. The inlet port 4 can be any type of suitable fluid connection port. The filter cartridge 10 is contained within a chamber of pump body 2. The pressurized fluid exits the pump head assembly 73 through a passageway 65 and traverses through an influent fluid cavity (i.e., duct) 11 to filter cartridge 10. The flush fluid used to remove the waterborne contaminants that did not permeate through filter cartridge 10 is discharged through flush port 5 after the fluid has first passed through flush-fluid cavity 41, flush valve or flow regulating valve 30, and flush-discharge cavity 42. The flush valve or flow regulating valve 30 controls the flow rate of flush fluid that passes through filter cartridge 10 and also relieves filtration pressures that exceed a predetermined level. The flush port 5 can be any type of suitable fluid connection port. The inlet port 4 is positioned near the flush port 5, and both ports are mechanically protected by pump head cover 9. The filtered fluid (effluent stream) produced by filter cartridge 10 is discharged through outlet port 18 (FIG. 6) after passing through flow separation end cap 16. If desired, a container can be threaded to flow separation end cap 16 to collect filtered fluid. To prevent contamination of the outlet port 18 when the device is not being used, the flow separation end cap 16 may be encapsulated by a removable cap 6.

Figure 11:
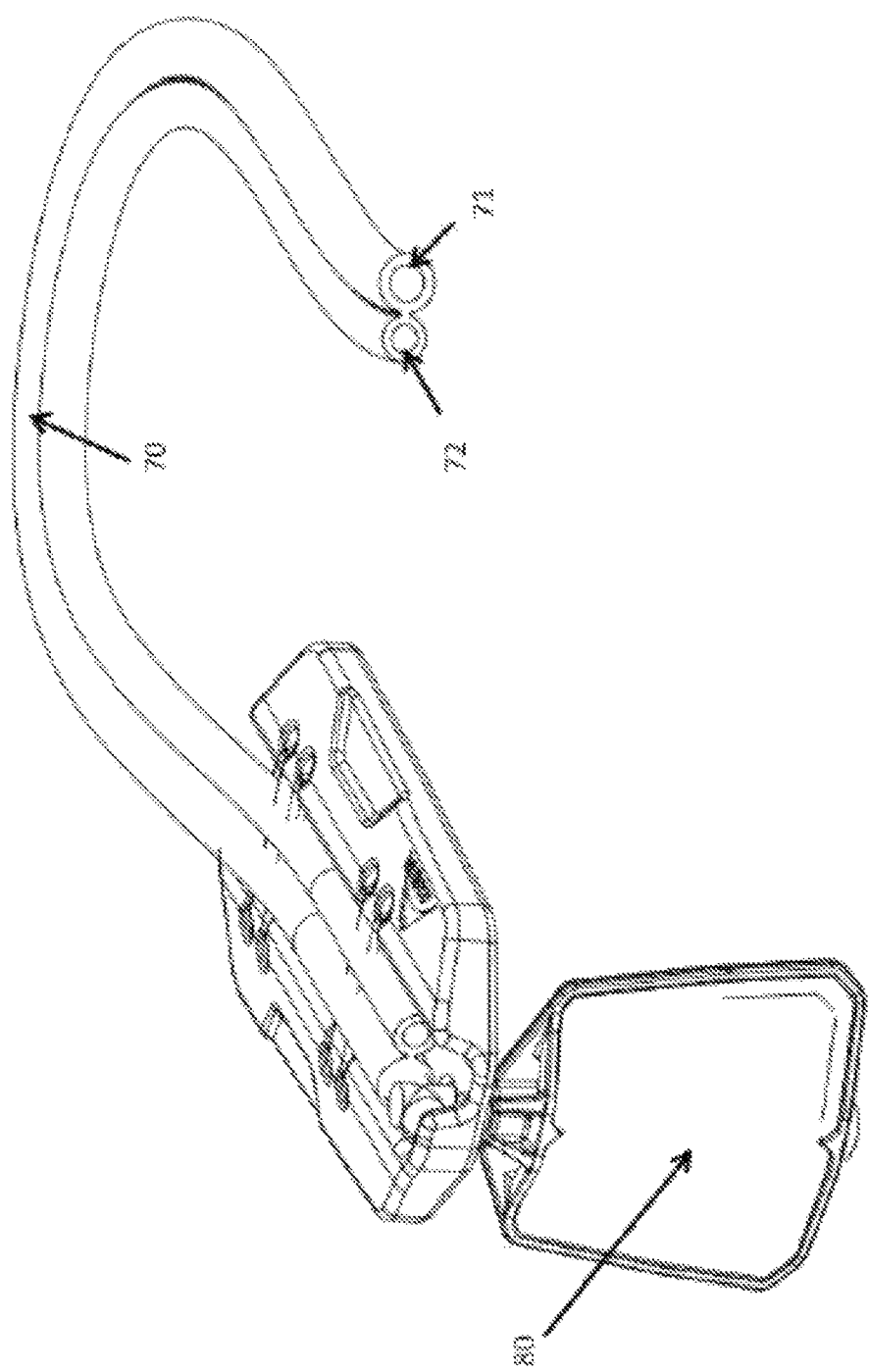
FIG. 11 illustrates a prefilter and dual-lumen hose assembly coupleable with the pump head assembly of the embodiment shown in FIG. 1.

Reference is now made to FIG. 11, which illustrates the prefilter and dual-lumen hose assembly. A flexible dual-lumen fluid hose 70 provides a fluid conduit between the fluid being filtered and the personal filtration device 1. The influent side 71 of the dual-lumen hose can be connected to the inlet port 4 and serve as the conduit for the unfiltered fluid being extracted from the fluid source (e.g., stream, creek, etc.). The discharge side 72 of the dual-lumen tubing is connected to the flush port 5 and serves as a conduit for transferring the flush fluid used to remove the clogging material formed inside the filter cartridge 10 during the filtration process to the fluid source of the liquid being purified. The flexible nature of the fluid hose is to facilitate wrapping the hose around the pump body 2 when the personal device 1 is not in use. Exemplary commercially available materials for fabricating the dual lumen fluid hose include rubber, silicone, polyethylene or other such flexible materials as is known in the art. The influent side 71 of the lumen fluid hose 70 is attached to a pre-filter assembly 80 that is comprised of a screen or mesh for preventing large-sized particles, such as leaves, twigs, large pieces of sediment, and the like, from entering into the influent side. The screen or mesh may possess hydrophilic properties to minimize entrainment of air into the system.

Figure 5:
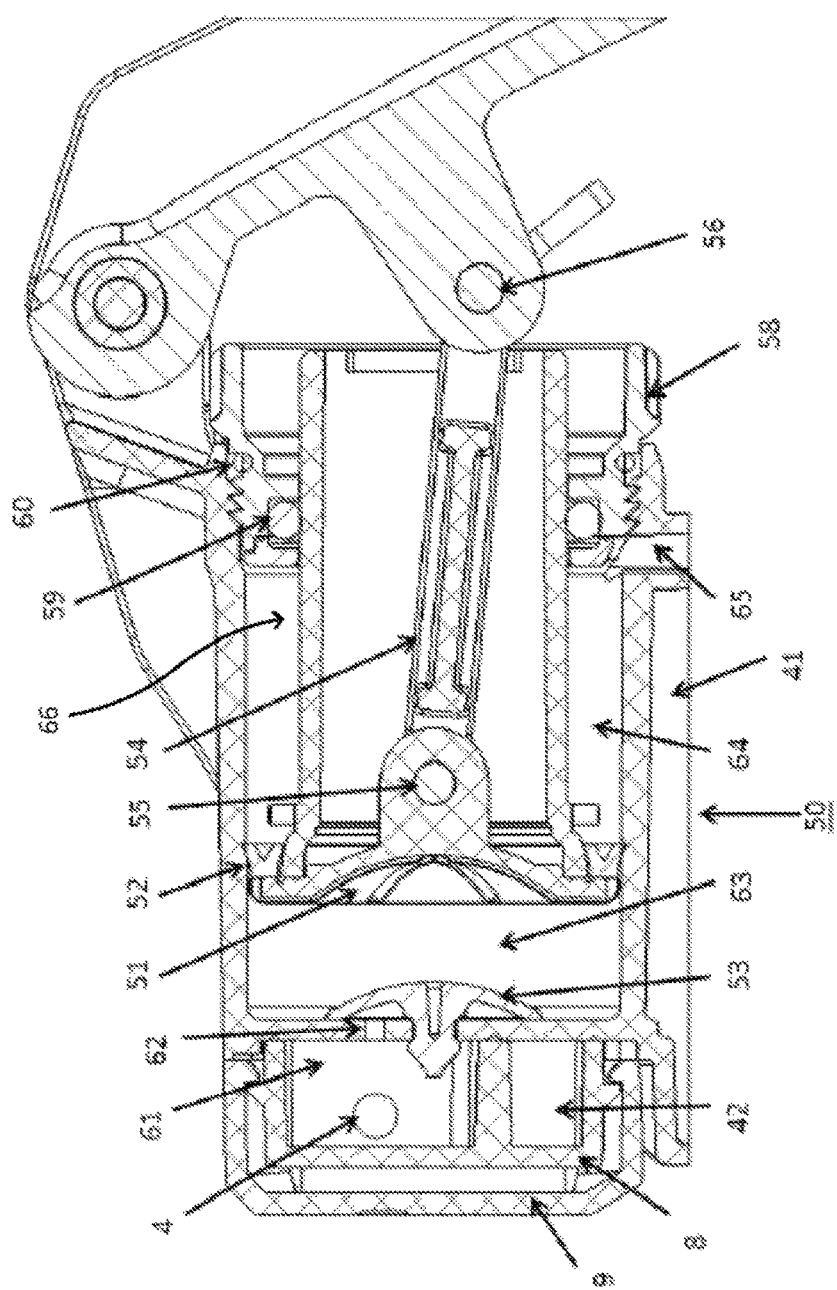
FIG. 5 is a cross-sectional view of the pump head assembly of the device embodiment shown in FIG. 1.

Referring now to FIG. 5, a side evaluation cross-sectional view of pump head assembly 73 is shown. In the illustrated embodiment, the pump head assembly 73 is a dual-acting (double-action) pump. Fluid is drawn in through the inlet port 4 and is discharged through the pressurized fluid outlet cavity 65 that is fluidly coupled to filter cartridge 10 when piston 51 is moved in both directions. The dual-acting pump is advantageous since it delivers a near-continuous flow of unfiltered fluid to the filter cartridge 10. In contrast, most personal hand-pump operated filters developed for purifying water in remote locations utilize a single-acting pump design. Single-acting hand-pump filters operate on the principle that fluid only enters the pump head in the out stroke (upstroke) When a piston/plunger is removed from a chamber and then is pushed by the piston/plunger through the filter on the in stroke (down stroke).

The pump head assembly 73 is comprised of a pump body 50, a piston 51, and a piston rod 66. An end of the pump body 50 opposite piston 51 is open to allow for the free movement of the piston rod 66. The piston end nut 58 enables the piston rod 66 to move back and forth inside the pump body 50 while maintaining piston rod in a concentric position inside the pump body. The piston end nut 58 furthermore secures O-ring 59 to the piston rod 66 and secures O-ring 60 to the pump body 50 which allows the piston rod 66 to effectively move back and forth inside the pump body without any leakage of the pressurized fluid contained within the pump head assembly 73. Actuation of the piston 51 relative to the pump body 50 is caused by the movement of the lever-action handle 3. The lever-action handle is pivotally mounted to the pump head 50 at pivot point 7. The lever-action handle 3 is pivotally mounted to piston 51 through link 54 at pivot point 56 and pivot point 55. The pump head assembly 73 also includes the inlet assembly 8, which is located in the pump head assembly 73 and contains the inlet fluid cavity 61 and flush-discharge cavity 42.

The flow path that the fluid undertakes inside the pump head assembly 73 is dependent on the movement of the piston 51. During air upstroke, in which the lever-action handle 7 is moved away from the pump body 50 and negative fluid pressure is created at inlet port 4, the unfiltered fluid enters the personal filtration device through the inlet port located on the inlet assembly 8 and enters the inlet fluid cavity 61. During the upstroke, the unfiltered fluid is able to flow through the umbrella valve passageway 62 into the pump inlet cavity 63 since the vacuum pressure created inside this cavity causes the fluid to deform and pass beyond the soft umbrella valve 53 which acts as a check valve that normally covers this passageway. The fluid remaining in pump outlet cavity 64 from the previous stroke is pressurized during an upstroke that energizes the piston cup seal 52 and creates a seal between inlet cavity 63 and pump outlet cavity 64 such that the pressurized fluid contained within the pump outlet cavity 64 cannot enter the pump inlet cavity 63, which is at vacuum pressure. However the fluid still contained within the pump outlet cavity 64 from the previous down stroke is forced to exit the pump head assembly 73 and proceed through the filter influent passageway 65 to reach the filter cartridge 10.

During a down stroke, in which the lever-action handle 7 is moved towards the pump body 2, the positive pressure inside the pump fluid cavity 63 causes the umbrella valve 53 to return to its closed position which prevents any fluid contained within the pump fluid cavity from being transferred to the inlet fluid cavity 61 through the umbrella valve passageway 62. During a down stroke, umbrella valve 53 acts as a closed check valve. Since the piston cup seal 52 only energizes in the upstroke direction, the fluid in pump fluid cavity 63 is pressurized on the down stroke, which allows the fluid to bypass the piston cup seal and transfer from the pump fluid cavity 63 to the pump outlet cavity 64. Simultaneously, the volume of fluid transferred from pump fluid cavity 63 to pump outlet cavity 64 proceeds through the filter influent passageway 65 to reach the filter cartridge 10.

There are a number of alternative-embodiment pump head assemblies that can perform the intended function of delivering the pressurized fluid to the filter cartridge 10, and therefore the illustrated pump assembly 73 is merely exemplary in nature and not limiting of the scope of the present invention. This task of delivering a pressurized fluid could be accomplished using a simple "single-acting" pump assembly, wherein moving the piston in one direction draws material into the pump through the inlet port 4 and moving the piston in the opposite direction discharges the material through the outlet port 18.

Figure 6:
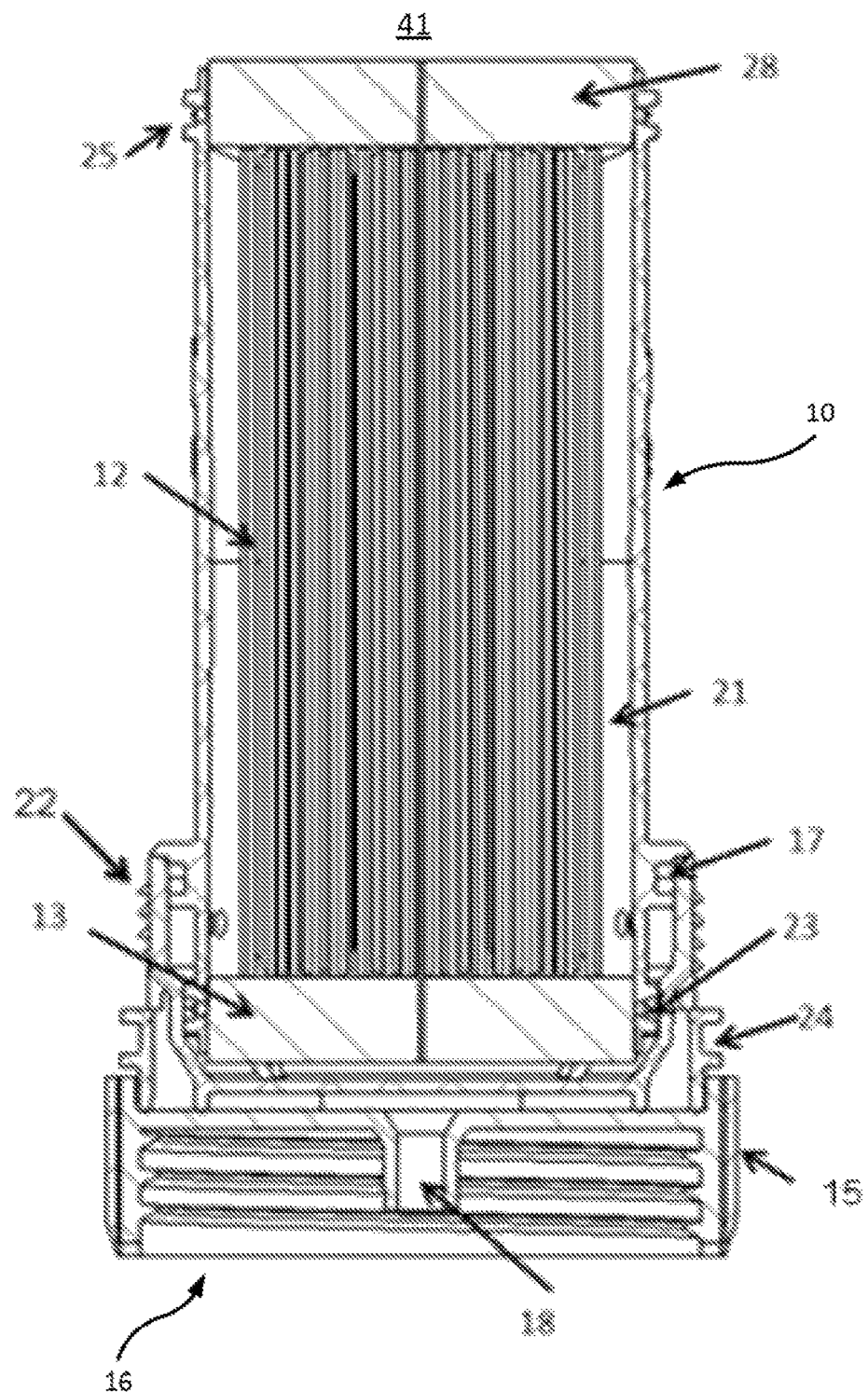
FIG. 6 is a cross-sectional view of the filter cartridge and flow separation endcap of the embodiment shown in FIG. 1.
Figure 7:
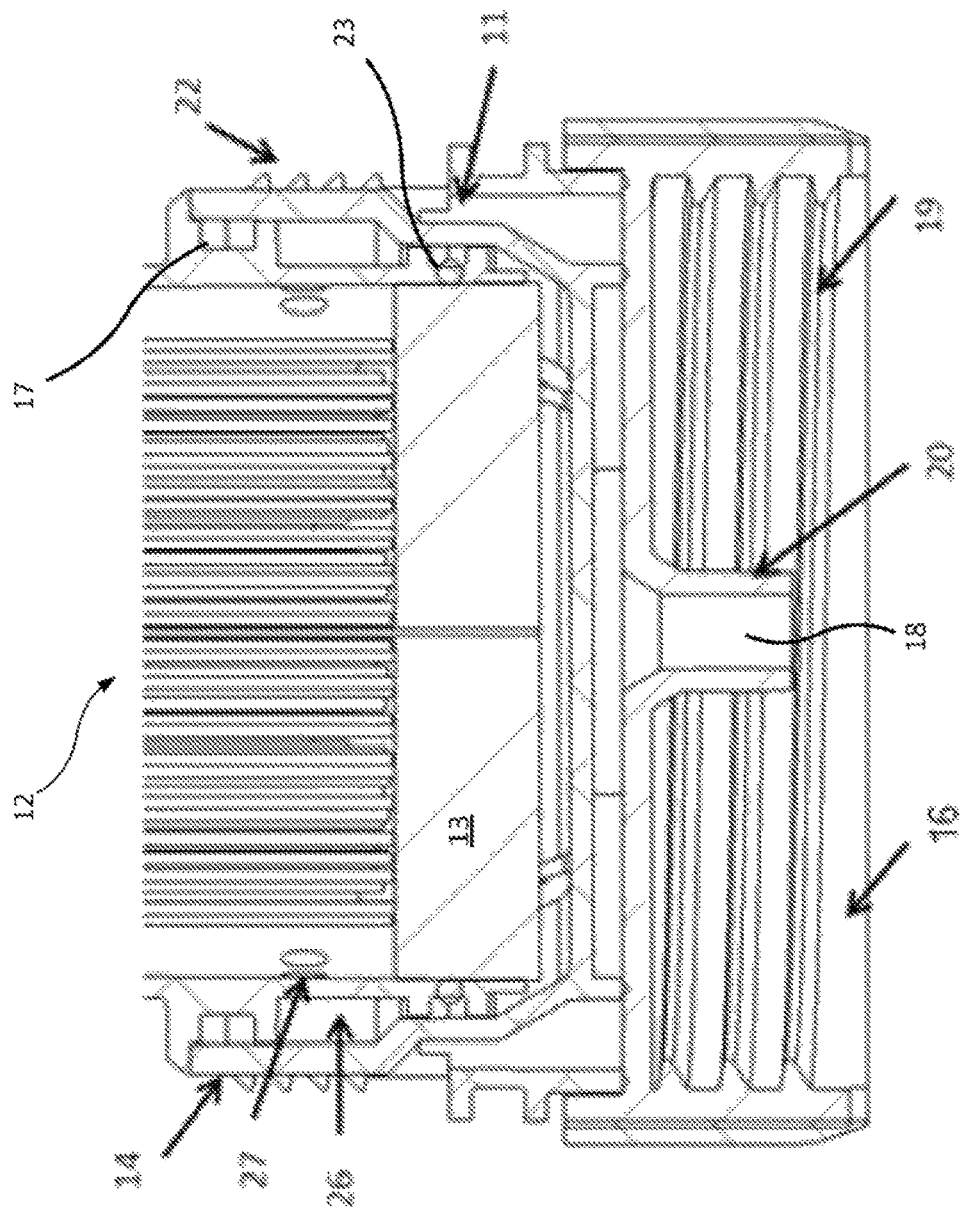
FIG. 7 is a close-up, partial cross-sectional view of the filter cartridge and flow separation end cap of the embodiment shown in FIG. 1.

Reference is now made to FIG. 6-7, which are side cross-sectional views of the filter cartridge 10 and the flow separation end cap 16. The filter cartridge 10 is designed to remove microbiological pathogens present in the unfiltered fluid through the use of a physical barrier mechanism and in turn includes a filter element consisting of a plurality of hollow fiber membranes 12, an influent end 13, and a flush end 28. As shown, the bundle of semi-permeable hollow fiber membranes 12 is longitudinally placed along the axis of the filter cartridge 10. The fiber membranes 12 may be potted at each end 13 and 28 of the filter cartridge 10 with polyurethane, epoxy, or other appropriate adhesive material known in the art. The potting material that surrounds hollow fiber membranes 12 at the influent end 13 and flush end 28 may be removed in a manner, such as trimming or cutting the adhesive material, to expose the lumens of the hollow fiber membranes.

The flow separation end cap 16 includes a filter inlet cavity with at least one L-shaped passageway of influent cavity 11 for radially directing the pressurized fluid to the filter cartridge 10, an outlet port 27 for dispensing the filtered fluid to a flow separator, a filtered fluid passageway 26 that is connected to the outlet port 18, flow separation O-rings 17 and 23 that seal against cylinder portion 14 to physically separate the unfiltered and filtered fluids that may reside within the end cap, grip 15 to facilitate the attachment or disengagement of the end cap to the pump body 2, and a removable cap 6 to prevent contaminants from entering into the filtered fluid passageway.

The filter cartridge 10 resides within the pump body 2 with the flush end 28 oriented towards the pump head assembly 73. The influent end 13 of filter cartridge 10 is sized to receive the flow separation end cap 16, which may be installed to be removable or permanently attached. The flush-fluid cavity 41 is created by separation between the flush end 28 of filter cartridge 10 and the pump head assembly 73. The filter influent passageway 65 is created by the separation between the pump body 2 and the filter cartridge 10. The external threads 22 of the flow separation end cap 16 mechanically secure the filter cartridge 10 to the pump body 2. O-rings 17 and 23 limit the unfiltered fluid traveling through filter influent passageway 65 to only the filter influent cavity 11 and the influent end 13 via L-shaped passageway to ensure that the filtered fluid can bypass the filter cartridge 10 and exit the personal filtration device through filtered fluid outlet port 18 without contamination. O-ring 24 seals the flow separation end cap 16 to the pump body 2 whereas O-ring 25 ensures that the flush fluid exiting from the filter cartridge 10 at the flush end 28 is directed towards the flush-fluid cavity 41 located at the base of the pump head assembly 73. O-ring 23 ensures that none of the unfiltered fluid traveling through filter influent passageway 65 can leak into the filtered fluid annulus 26 to contaminate the filtered fluid being dispensed through the outlet port 18.

The unfiltered fluid traveling through filter influent passageway 65 enters the filter cartridge 10 through the filter influent cavity 11 located on the flow separation end cap 16 which directs the fluid towards the exposed lumens of the hollow fiber membranes 12 located at the influent end 13. The unfiltered fluid travels through the lumens of the hollow fiber membranes 12 towards the flush end 28 of the filter cartridge 10. The pressure differential between the inside and outside surfaces of the hollow fiber membranes 12 causes the unfiltered fluid to permeate through the semipermeable membrane into the effluent cavity 21 located inside the filter cartridge 10. The filtered fluid collected in the effluent cavity 21 exits the filter cartridge 10 through opening 27, into annulus 26 and into the flow separation end cap 16 where it is subsequently directed to the outlet port 18.

Traditional hand-operated personal filtration devices use a dead-end filtration mode of operation in which all of the unfiltered fluid that enters the filter cartridge permeates through the physical barrier membrane and is converted into a filtered fluid. This flow configuration is problematic as eventually the membrane surface will become clogged by the filter cake that is being formed by the particulate matter that is being removed by the physical barrier from the unfiltered fluid. At some stage during the operation of the personal filtration devices, a manual cleaning step needs to be initiated to physically remove the filter cake that has formed on the membrane surface. An embodiment eliminates this manual cleaning step by causing some of the unfiltered fluid that enters filter cartridge 10 to traverse the entire length of the hollow fiber membranes 12 such that it exits the filter cartridge through the open lumens of the hollow fiber membranes at flush end 28. This flush-fluid motion mitigates the formation of a filter cake inside the lumens since the flush fluid transports the particulate matter rejected by the hollow fibers away from the membrane surface. The flush fluid containing the rejected particulate matter that exits the filter cartridge 10 passes through the flush-fluid cavity 41, the fluid outlet cavity 42 and the flush valve 30 before being expelled from the personal filtration device through the flush port 5. The fraction of the unfiltered fluid that exits the personal filtration device through flush port 5 is controlled by the orifice dimensions of the flush valve 30.

Hollow fiber membranes 12 for removing microbiological pathogens typically used in the construction of a personal filtration device can either be classified as ultrafiltration membranes or microfiltration membranes depending on their pore size. In a disclosed embodiment, the hollow fiber membrane 12 could either be an ultrafiltration or microfiltration membrane. Ultrafiltration hollow fiber membranes, which have a pore size of less than 0.05 microns, and preferentially between 0.015 and 0.025 microns, serve as a physical barrier capable of removing viruses, bacteria and protozoan cysts from a microbiologically contaminated water source. Microfiltration hollow fiber membranes, which have a pore size of greater than 0.05 microns, and preferentially between 0.1 and 0.3 microns, serve as a physical barrier capable of removing bacteria and protozoan cysts from a contaminated water source. Irrespective of the pore size of the hollow fiber membrane, both membranes are able to produce potable water without negatively impacting the palatability of the treated water. Exemplary commercially available hollow fiber membranes are constructed from polysulfone, polyethersulfone, cellulose or other materials suitable for water purification. The hollow fiber membranes should possess an outer diameter between 300 and 1,000 microns, and preferably have an outer diameter between 350 and 500 microns. The wall thickness of the hollow fiber membranes should be between 50 and 200 microns, and preferably between 50 and 100 microns.

In traditional hand-operated personal filtration devices that utilize a hollow fiber membrane, the filter cartridge is comprised of heterogeneous combination of hydrophilic and hydrophobic hollow fiber membranes. Although hydrophilic hollow fiber membranes are appropriate for filtering fluids, such as water, they do not provide a convenient pathway for removing entrapped air inside the filter cartridge. In a disclosed embodiment, the filter cartridge 10 is comprised solely of hydrophilic hollow fiber membranes 12 since an alternate pathway for removing entrapped air from the filter cartridge is provided. Entrapped air inside the lumens of the hollow fiber membranes 12 can be carried by the aforementioned flush fluid used to self-clean the membrane as it traverses the entire length of the hollow fiber membrane. The entrapped air, along with the flush fluid, will exit the filter cartridge 10 into the fluid outlet cavity 42 before finally being expelled from the personal device through the flush port 5. Operationally, this means that the filter cartridge 10 does not have to be primed before the personal filtration device can used in the field in order to remove the entrapped air by first "bleeding" the trapped air to ensure proper operation.

In one embodiment, the flow separation end cap 16 provides a mechanism for rotationally coupling the personal filtration device 1 to a container into which the filtered fluid can be discharged. A container with a corresponding threaded top can simply be threaded into threaded portion 19 of the flow separation end cap 16. This eliminates the need to use an extra person to hold the container, and eliminates the need to hold the filter directly over a container when filtering water. Alternatively, a flexible fluid hose can be inserted over the barb 20 that is placed on the exterior of the outlet port 18 to discharge the filtered fluid.

Figure 8:
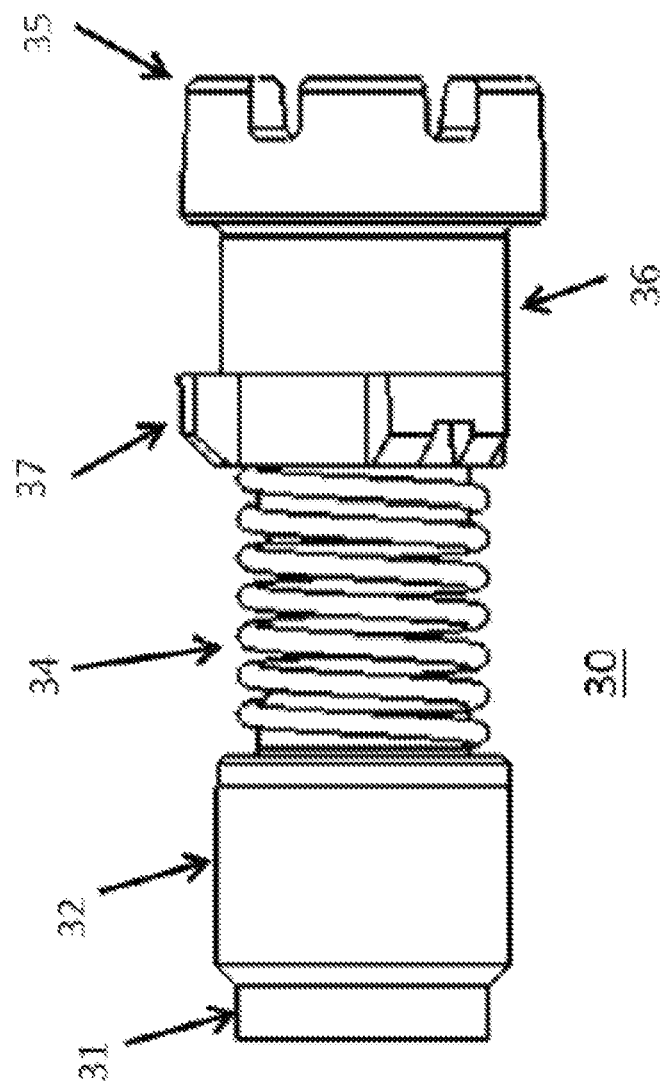
FIG. 8 is a side view of the flush valve and flow regulating valve of the embodiment shown in FIG. 1.
Figure 9:
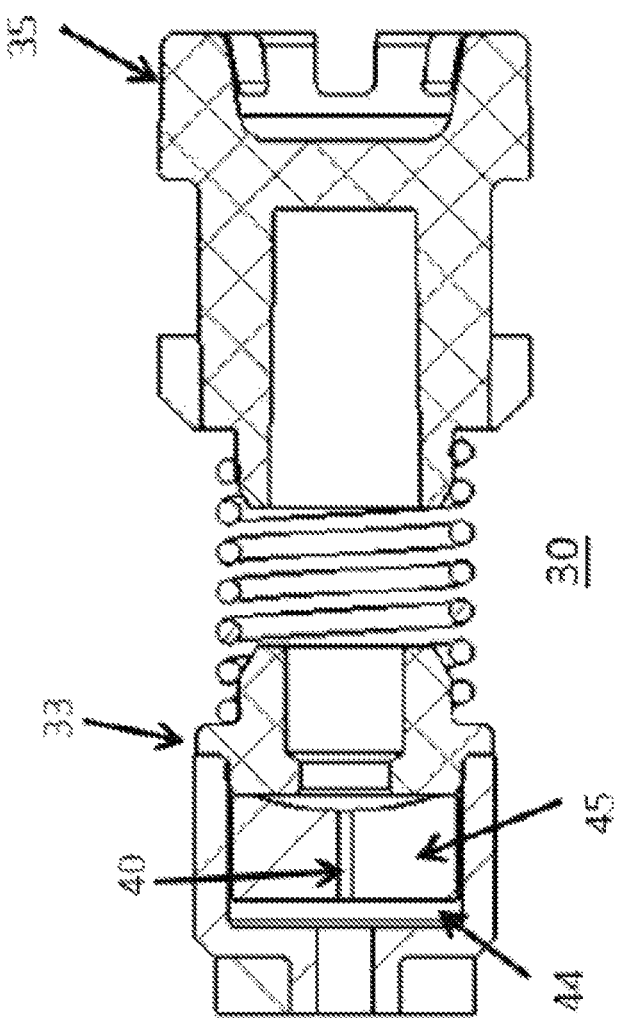
FIG. 9 is a cross-sectional view of the flush valve and flow-regulating valve of the embodiment shown in FIG. 1.
Figure 10:
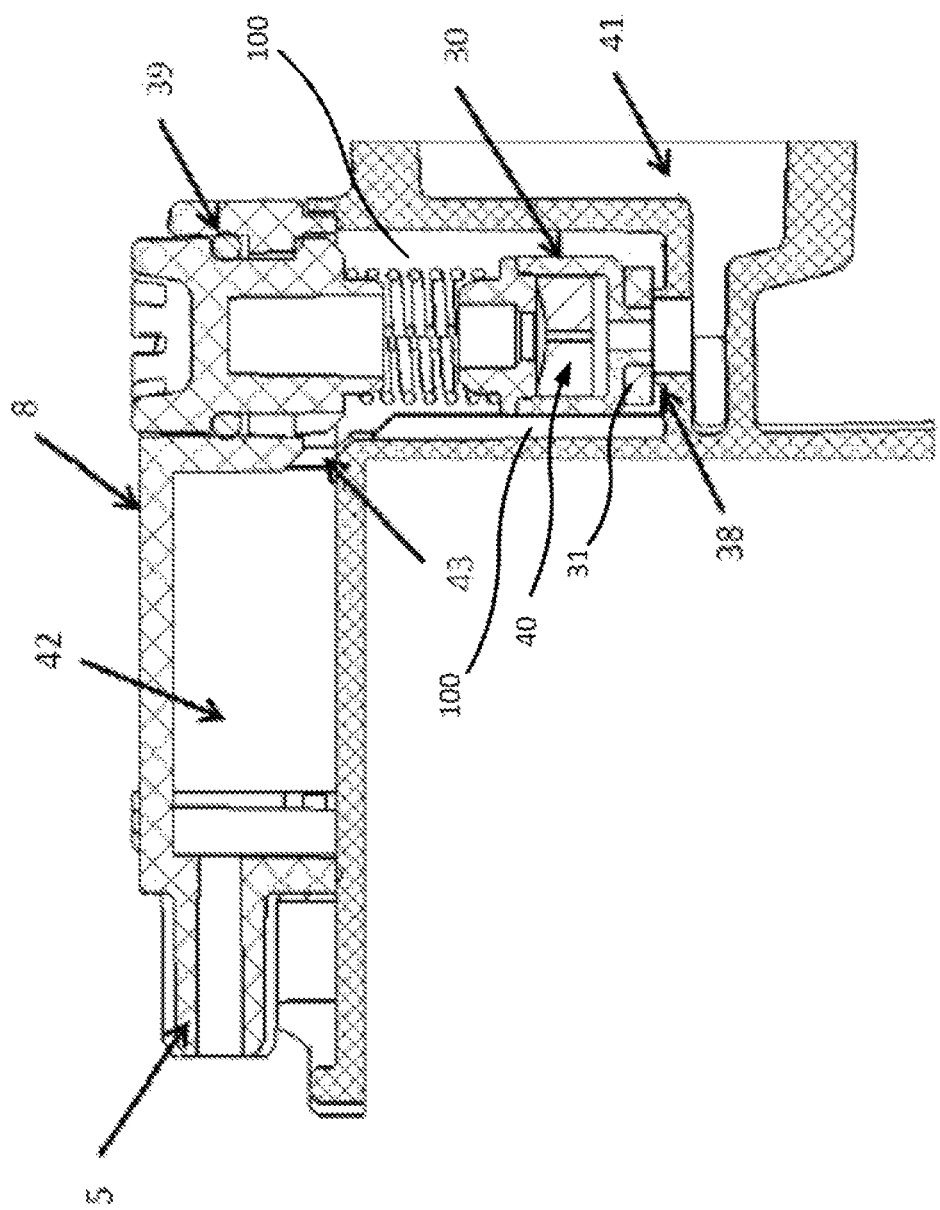
FIG. 10 is a cross-sectional view of the flush-fluid pathway within the pump head assembly of the embodiment shown in FIG. 1.

Reference is now made to FIG. 8-10, which are views of the flush valve 30 of an embodiment, which controls the volume of the flush fluid exiting the filter cartridge 10 during normal operation of the personal filtration device 1 and relieves pressure that builds up inside the filter cartridge beyond a predetermined level. Such pressure buildup may be generally caused by clogging or some other type of obstruction inside the filter cartridge 10, which prevents normal flow of water through the filter cartridge. The flush valve 30, located at the base of the pump head assembly 73, is hydraulically connected to the flush-fluid cavity 41 and the outlet cavity 42. The flush valve 30 is comprised of housing 32 that contains face seal 31, which seals the flush valve to the pump body 2 at sealing surface 38, a flow-restriction orifice 40 that restricts the flow of fluid entering the flush valve from fluid cavity 41, a permanently attached cap 33 mounted onto a valve spring 34, and outer valve cap 35, which includes bayonet retention connector 37 to secure the flush valve to the inlet assembly 8. O-ring 39 is secured to the periphery of the flush valve 30 on mounting surface 36 to seal the space between flush valve and the inlet assembly 8 and channel fluid travel exclusively through passageway 43 and into the flush fluid outlet cavity 42.

During normal operation, the valve spring 34 provides a predetermined biasing force to create a seal between face seal 31 and sealing surface 38. Under normal operation, all fluid entering flush-fluid cavity 41 is pressurized to pass through flow-restriction orifice 40. The geometry of the flow-restriction orifice 40 may be configured such that the fraction of unfiltered fluid that is discharged from flush-fluid cavity 41 through the flush port 5 is between 1 and 30%— preferably between 5 and 10%—of the fluid entering through inlet port 4. However if fluid pressure inside the filter cartridge 10 exceeds a safe, predetermined level, the valve spring 34 allows seal 31 to at least partially disengage from sealing surface 38 to create a larger and less restricted flow path. Consequently, the fraction of unfiltered fluid that is discharged through the flush port 5 is temporarily increased in an attempt to dislodge any obstruction inside filter cartridge 10 that may be preventing the flow of fluid through the hollow fiber membranes 12. Movement of the flush fluid from fluid cavity 41 may flow through restriction orifice 40 as well as through the less-restricted flow path 100 accessible between seal 31 and sealing surface 38, which flows to the outlet cavity 42 through passageway 43. Only when the fluid pressure inside the filter cartridge 10 returns below the predetermined level does the valve spring 34 fully re-engage seal 31 with sealing surface 38 such that fluid flush is required to travel exclusively through restriction orifice 40.

Over the lifespan of the filter cartridge 10, the hollow fiber membranes 12 may begin to accumulate particulates despite the fluid-flush mechanism that transports much of the filter cake out of flush port 5. As a result the pressure in cavity 41 increases but may be still below the predetermined level required to actuate the relief valve spring 34. Pressure in cavity 41 may be the same as that in cavity 44. This pressure acts on a face of flow regulating valve 45. The flow regulating valve 45 may be comprised of an elastomeric material such as rubber or polyurethane. As the pressure in cavity 44 increases, the flow regulating valve 45 deforms and the diameter of the flow orifice 40 decreases. The flow regulation valve 45 may be tuned such that pressures in the normal operating range results in the preferred fluid flush bypass volume 5 and 10% of the inlet stream.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A portable liquid-filtration device, comprising:
   an inlet port;
   a filtering portion comprising a filtering medium and fluidly coupled to the inlet port;
   a filtered-liquid output port fluidly coupled to the filtering portion;
   a flush port fluidly coupled to the filtering portion;
   a manually activated pump assembly fluidly coupled to the inlet port, filtering portion, output port and flush port, the pump assembly configured, when activated, to create a negative fluid pressure at the inlet port and a positive fluid pressure at the output port and the flush port; and
   a flow-regulation valve fluidly coupled to the filtering portion and the flush port, the flow-regulation valve having an orifice configured to decrease in diameter in response to an increase in pressure within the filtering portion,
   wherein, as a consequence of activation of the pump assembly, the filtering portion receives unfiltered liquid from the inlet port, the output port receives from the filtering portion only liquid traversing the filtering medium in a first direction, and the flush port receives from the filtering portion liquid traversing the filtering medium in a second direction different from the first direction.

2. The device of claim 1, wherein the flow-regulation valve is positioned adjacent a cavity fluidly coupled to the filtering portion, wherein the flow-regulation valve is formed of a elastomeric material having the orifice centrally formed therein, and wherein an increase in pressure in the cavity deforms the flow-regulation valve and decreases the diameter of the orifice.

3. The device of claim 1, wherein the flow-regulation valve includes a biasing element, a seal and a sealing surface, wherein the biasing element is configured to force the seal against the sealing surface when pressure in the filtering portion is below a predetermined level thereby causing all liquid traversing to the flush port to flow through the orifice, and wherein the biasing element is configured to at least partially disengage the seal from the sealing surface to create a bypass of the orifice and to increase a volume of liquid traversing to the flush port when pressure in the filtering portion is at or above the predetermined level.

4. The device of claim 1, wherein the pump assembly comprises a piston, wherein the piston forces liquid through the filtering portion to both the flush port and output port on both of an upstroke and a downstroke of the piston.

5. The device of claim 1, further comprising an intake hose assembly, the hose assembly comprising a first lumen coupled at a proximal end to the inlet port, a second lumen coupled at a proximal end to the flush port, and a screen coupled to the first and second lumens at distal ends of the lumens.

6. The device of claim 1, wherein the first and second directions are substantially orthogonal to one another.

7. The device of claim 1, wherein:
   the filtering portion has a proximal end and a distal end; and
   the inlet port and flush port are positioned at the proximal end.

8. The device of claim 7, wherein the output port is positioned at the distal end.

9. The device of claim 1, further comprising first and second ducts respectively fluidly coupling the flush port and output port to the filtering portion.

10. The device of claim 1, further comprising a threaded end cap encompassing the output port.

11. A portable liquid-filtration device, comprising:
    an inlet port;
    a filtering portion fluidly coupled to the inlet port, the filtering portion comprising at least one permeable membrane having a length;
    a filtered-liquid output port fluidly coupled to the filtering portion;
    a flush port fluidly coupled to the filtering portion;
    a manually activated pump assembly fluidly coupled to the inlet port, filtering portion, output port and flush port, the pump assembly configured, when activated, to create a negative fluid pressure at the inlet port and a positive fluid pressure at the output port and the flush port; and
    a flow-regulation valve fluidly coupled to the filtering portion and the flush port, the flow-regulation valve having an orifice configured to decrease in diameter in response to an increase in pressure within the filtering portion,
    wherein, as a consequence of activation of the pump assembly, the filtering portion receives unfiltered liquid from the inlet port, the output port receives from the filtering portion only liquid that has permeated the membrane, and the flush port receives from the filtering portion liquid traversing the length of the membrane.

12. The device of claim 11, wherein the flow-regulation valve is positioned adjacent a cavity fluidly coupled to the filtering portion, wherein the flow-regulation valve is formed of a elastomeric material having the orifice centrally formed therein, and wherein an increase in pressure in the cavity deforms the flow-regulation valve and decreases the diameter of the orifice.

13. The device of claim 11, wherein the flow-regulation valve includes a biasing element, a seal and a sealing surface, wherein the biasing element is configured to force the seal against the sealing surface when pressure in the filtering portion is below a predetermined level thereby causing all liquid traversing to the flush port to flow through the orifice, and wherein the biasing element is configured to at least partially disengage the seal from the sealing surface to create a bypass of the orifice and to increase a volume of liquid traversing to the flush port when pressure in the filtering portion is at or above the predetermined level.

14. The device of claim 11, wherein the pump assembly comprises a piston, wherein the piston forces liquid through the filtering portion to both the flush port and output port on both of an upstroke and a downstroke of the piston.

15. The device of claim 11, further comprising an intake hose assembly, the hose assembly comprising a first lumen coupled at a proximal end to the inlet port, a second lumen coupled at a proximal end to the flush port, and a screen coupled to the first and second lumens at distal ends of the lumens.

16. The device of claim 11, wherein:
the filtering portion has a proximal end and a distal end; and
the inlet port and flush port are positioned at the proximal end.

17. The device of claim 16, wherein the output port is positioned at the distal end.

18. The device of claim 11, further comprising first and second ducts respectively fluidly coupling the flush port and output port to the filtering portion.

19. The device of claim 11, further comprising a threaded end cap encompassing the output port.

* * * * *